(12) United States Patent
Meng et al.

(10) Patent No.: US 10,585,299 B2
(45) Date of Patent: Mar. 10, 2020

(54) METHOD OF THINNING DISPLAY PANEL, AND DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Qingyong Meng, Beijing (CN); Ji Jin, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/501,757

(22) PCT Filed: Sep. 9, 2016

(86) PCT No.: PCT/CN2016/098575
§ 371 (c)(1),
(2) Date: Feb. 3, 2017

(87) PCT Pub. No.: WO2017/067344
PCT Pub. Date: Apr. 27, 2017

(65) Prior Publication Data
US 2018/0217415 A1    Aug. 2, 2018

(30) Foreign Application Priority Data
Oct. 20, 2015    (CN) .......................... 2015 1 0683559

(51) Int. Cl.
*G02F 1/135*    (2006.01)
*G02F 1/13*     (2006.01)
*G02F 1/1333*   (2006.01)

(52) U.S. Cl.
CPC .......... *G02F 1/1303* (2013.01); *G02F 1/1333* (2013.01); *G02F 2001/1355* (2013.01); *G02F 2001/133302* (2013.01)

(58) Field of Classification Search
CPC ....... G02F 1/1303; G02F 2001/133302; G02F 1/1333; G02F 1/133351
See application file for complete search history.

(56) References Cited

U.S. PATENT DOCUMENTS

2002/0060323 A1* 5/2002 Jeong ................ G02F 1/136286
                                            257/91
2003/0174275 A1* 9/2003 Asano .................. H01L 27/1214
                                            349/187

(Continued)

FOREIGN PATENT DOCUMENTS

CN    1453624 A     11/2003
CN    101201490 A    6/2008

(Continued)

OTHER PUBLICATIONS

First Office Action for Chinese Application No. 201510683559.3, dated Aug. 29, 2017, 7 Pages.

(Continued)

*Primary Examiner* — Francisco W Tschen
(74) *Attorney, Agent, or Firm* — Brooks Kushman P.C.

(57) ABSTRACT

A method of thinning a display panel and a display device are provided, to solve the technical issue in the related art that a color filter substrate of an ultrathin display panel is of a lower strength if the color filter substrate is too thin. According to the method of thinning the display panel, the intermediate layer is coated onto the surface of the first substrate away from the second substrate, the protection adhesive is attached on the intermediate layer, and the second substrate is chemically thinned at one side thereof, (Continued)

thereby protecting the first substrate from being chemically thinned during the chemical thinning.

9 Claims, 2 Drawing Sheets

(56) References Cited

U.S. PATENT DOCUMENTS

| | | |
|---|---|---|
| 2003/0203101 A1 | 10/2003 | Haubrich et al. |
| 2005/0240061 A1* | 10/2005 | Takahashi ............... C07C 15/38 568/306 |
| 2009/0222746 A1* | 9/2009 | Chirica .................. G16H 10/40 715/762 |
| 2009/0258565 A1 | 10/2009 | Chwu et al. |
| 2010/0252839 A1* | 10/2010 | Sagawa ............... H01L 51/5221 257/88 |
| 2010/0308013 A1 | 12/2010 | Miyamoto |
| 2014/0291558 A1* | 10/2014 | Laermer ............. F16K 99/0036 251/11 |
| 2017/0213857 A1 | 7/2017 | Yang et al. |

FOREIGN PATENT DOCUMENTS

| | | |
|---|---|---|
| CN | 102951845 A | 3/2013 |
| CN | 103864311 A | 6/2014 |
| CN | 103880294 A | 6/2014 |
| CN | 104849900 A | 8/2015 |
| CN | 105137639 A | 12/2015 |
| JP | H05249422 A | 9/1993 |
| JP | 200904643 A | 9/2009 |
| KR | 1020100022644 A | 3/2010 |
| TW | 200942500 A | 10/2009 |

OTHER PUBLICATIONS

International Search Report and Written Opinion for Application No. PCT/CN2016/098575, dated Dec. 7, 2016, 9 Pages.
Second Office Action for Chinese Application No. 201510683559.3, dated Dec. 28, 2017, 6 Pages.

* cited by examiner

METHOD OF THINNING DISPLAY PANEL, AND DISPLAY DEVICE

CROSS-REFERENCE TO RELATED APPLICATIONS

This application is the U.S. national phase of PCT Application No. PCT/CN2016/098575 filed on Sep. 9, 2016, which claims priority to Chinese Patent Application No. 201510683559.3 filed on Oct. 20, 2015, the disclosures of which are incorporated in their entirety by reference herein.

TECHNICAL FIELD

The present disclosure relates to the field of display technology, and in particular to a method of thinning a display panel and a display device.

BACKGROUND

In the display field, the display device trends to become lighter and thinner, and one way to achieve such display device is to use an ultrathin display panel. Currently, a common method of manufacturing the ultrathin display panel is to manufacture a display panel by a thick substrate and then thin the display panel chemically, so as to form an ultrathin display panel.

SUMMARY

A method of thinning a display panel and a display device are provided in the present disclosure, so as to solve the technical issue in the related art that a color filter substrate of an ultrathin display panel may be of a lower strength and a panel thereof may be of an insufficient pressure resistance if the color filter substrate is too thin.

The present disclosure provides a method of thinning a display panel. The display panel includes a first substrate and a second substrate oppositely arranged to form a cell. The method includes: coating an intermediate layer onto a surface of the first substrate away from the second substrate; attaching a protection adhesive on the intermediate layer; and thinning chemically the second substrate at a side thereof away from the first substrate.

Optionally, a material of the intermediate layer includes paraffin.

Optionally, the method further includes, subsequent to the thinning chemically the second substrate at a side thereof away from the first substrate: removing the protection adhesive and removing the intermediate layer.

Optionally, the coating the intermediate layer onto the surface of the first substrate away from the second substrate specifically includes: heating the paraffin, coating the heated paraffin onto the surface of the first substrate away from the second substrate, and cooling the paraffin to an indoor temperature.

Optionally, the method further includes, prior to the removing the protection adhesive and removing the intermediate layer and subsequent to the thinning chemically the second substrate at a side thereof away from the first substrate: heating the paraffin to melt the paraffin.

Optionally, the paraffin is heated to a temperature in a range from 50 degrees centigrade to 80 degrees centigrade.

Optionally, the method further includes thinning chemically the first and second substrates simultaneously.

Optionally, the second substrate has a thickness in a range from 0.1 millimeter to 0.35 millimeter in the case that the second substrate is chemically thinned at the side thereof away from the first substrate and the first and second substrates are chemically thinned simultaneously.

Optionally, the first substrate is a color filter substrate, and the second substrate is an array substrate.

Optionally, the intermediate layer coated on the first substrate has a thickness in a range from 0.5 millimeter to 1 millimeter.

Optionally, the thinning chemically the second substrate at a side thereof away from the first substrate includes: thinning the second substrate by 0.01 millimeter to 0.12 millimeter at the side thereof away from the first substrate.

Optionally, the removing the intermediate layer includes: washing away the intermediate layer by a solvent.

Optionally, the method includes, subsequent to the washing away the intermediate layer by a solvent: washing away the intermediate layer by ozone.

Optionally, the method further includes, subsequent to the washing the intermediate layer using ozone: immersing the display panel in an etching liquid.

Optionally, the thinning chemically the second substrate at a side thereof away from the first substrate includes: immersing the display panel in an etching liquid.

The present disclosure further provides a display device including a display panel manufactured by the above-mentioned method.

According to the method of thinning the display panel of the present disclosure, the intermediate layer is coated onto the surface of the first substrate away from the second substrate, the protection adhesive is attached on the intermediate layer, and the second substrate is thinned chemically at one side thereof, thereby protecting the first substrate from being chemically thinned during the chemical thinning and achieving an asymmetric thinning. By such method, the first substrate of the display panel is thicker than the second substrate thereof, so that the display panel has a high strength and a good supporting capacity. When external force such as pressure is applied, the display panel can be quickly recovered, so as to avoid the abnormal display and the like. The display panel formed by the method in the present disclosure is applicable to a variety of display devices, in particular to the ultrathin liquid crystal display device.

Figure 1:
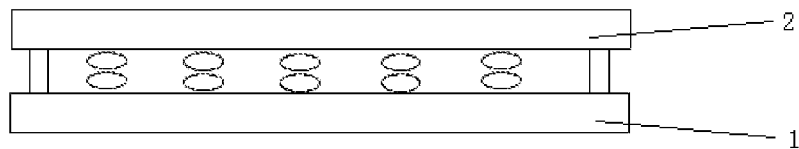
FIG. 1 is a schematic diagram of a display panel in the related art.

Reference numerals: 1, array substrate; 2, color filter substrate; 3, intermediate layer; 4, protection adhesive.

DETAILED DESCRIPTION

For a better understanding of the technical solutions of the present disclosure, the present disclosure will be described in details in conjunction with the drawings and embodiments.

The inventors find at least the following issues existing in the related art. As shown in FIG. 1, substrates of an ultrathin display panel include an array substrate 1 and a color filter substrate 2. The array substrate 1 and color filter substrate 2 are generally thinned simultaneously. However, if the color filter substrate 2 is too thin, the strength thereof may be lowered and the pressure resistance of the panel may be insufficient.

A method of thinning a display panel is provided in some embodiments of the present disclosure. The display panel includes a first substrate and a second substrate oppositely arranged to form a cell. The method includes the following steps:

Step 1: coating an intermediate layer onto a surface of the first substrate away from the second substrate;

Step 2: attaching a protection adhesive on the intermediate layer;

Step 3: thinning chemically the second substrate at one side thereof.

According to the method of thinning the display panel in some embodiments of the present disclosure, the intermediate layer is coated onto the surface of the first substrate away from the second substrate, the protection adhesive is attached on the intermediate layer, and the second substrate is thinned chemically at one side thereof, thereby protecting the first substrate from being chemically thinned during the chemical thinning and achieving an asymmetric thinning. By such method, the first substrate of the display panel is thicker than the second substrate thereof, so that the display panel has a high strength and a good supporting capacity. The display panel formed by the method in the present disclosure is applicable to a variety of display devices, in particular to the ultrathin liquid crystal display device.

Figure 2:
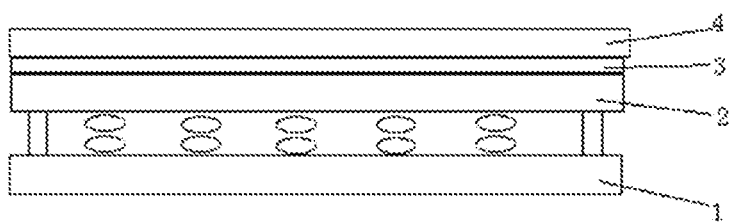
FIG. 2 is a schematic diagram of a method of thinning a display panel in some embodiments of the present disclosure.

A method of thinning a display panel is provided in some embodiments of the present disclosure. As shown in FIG. 2, the display panel includes a first substrate and a second substrate oppositely arranged to form a cell. The method includes the following steps:

Step 1: coating an intermediate layer 3 onto a surface of the first substrate away from the second substrate.

Optionally, the first substrate is a color filter substrate 2, and the second substrate is an array substrate 1.

That is, the color filter substrate 2 is usually thicker, so that the display panel may have a high strength and a good supporting capacity. When external force such as pressure is applied, the display panel can be quickly recovered, so as to avoid the abnormal display and the like.

Optionally, the intermediate layer 3 is made of paraffin.

That is, the paraffin is used to protect the first substrate, which facilitates the subsequent coating of the protection adhesive 4. Further, since paraffin is relatively smooth, the first substrate will not be damaged when peeling off the protection adhesive 4 after the second substrate is thinned separately.

Optionally, the intermediate layer 3 coated onto the first substrate in Step 1 has a thickness in the range from 0.5 mm to 1 mm.

That is, the paraffin thickness of 0.5 mm-1 mm is more appropriate. Too thick paraffin is not conducive to the subsequent coating of the protection adhesive 4, and too thin paraffin cannot protect the first substrate.

Optionally, Step S1 of coating the intermediate layer 3 onto the surface of the first substrate away from the second substrate specifically includes: heating the paraffin, coating the heated paraffin onto the surface of the first substrate away from the second substrate, and cooling the paraffin to an indoor temperature.

That is, due to the intrinsic properties of the paraffin, the paraffin may be softened or even melted when being heated, and coating the soft or even flowable paraffin onto the first substrate may facilitate the practical operation in the process.

Optionally, the paraffin is heated to a temperature in the range from 50° C. to 80° C.

That is, based on actual production requirements, those skilled in the art may adjust the heating temperature of the paraffin based on experiences to facilitate the coating. Usually, it is relatively appropriate to heat the paraffin to a temperature of 50° C. to 80° C.

Step 2: attaching the protection adhesive 4 on the intermediate layer 3.

Step 3: thinning chemically the second substrate at a side thereof away from the first substrate.

Optionally, in Step 3, the second substrate is thinned chemically at the side thereof away from the first substrate by 0.01 mm to 0.12 mm.

That is, during the asymmetric thinning process, second substrate is commonly thinned by 0.01 mm to 0.12 mm. That is, the asymmetric thinning makes the second substrate to be thinner than the first substrate by 0.01 mm to 0.12 mm. In this way, the first substrate has a high strength, and the specific strength may be adjusted based on various requirements.

Optionally, the method further includes, subsequent to Step 3 of thinning chemically the second substrate at a side thereof away from the first substrate and prior to Step 4 of removing the protection adhesive 4 and removing the intermediate layer 3: heating the paraffin to melt the paraffin of the first substrate.

That is, if the protection adhesive is peeled off directly without coating the paraffin onto the first substrate, scratches and notches may occur on the surface of the first substrate. By heating the paraffin to soften the same and then peeling off the protection adhesive 4, the first substrate may not be damaged and scratches and notches may not occur on the surface of the first substrate, and thus the first substrate is protected.

Optionally, the chemical thinning specifically includes immersing the display panel in a container containing an etching liquid.

That is, the chemical thinning of the present disclosure specifically includes providing the etching liquid in the container, and immersing the display panel in the etching liquid. The etching liquid includes a mixture of one or more of hydrofluoric acid, concentrated nitric acid and concentrated hydrochloric acid.

Step 4: removing the protection adhesive 4 and removing the intermediate layer 3.

Optionally, the intermediate layer 3 is washed away using a solvent.

That is, the paraffin is heated until the paraffin is softened and then the protection adhesive 4 is peeled off. During this process, the paraffin on the side adjacent to the protection adhesive 4 is inevitably to be peeled off. In order to thoroughly remove the paraffin, a solvent may be used to wash away the paraffin remaining on the surface of the first substrate. Further, ozone may be used to wash away the first substrate.

Optionally, the method further includes chemically thinning the first and second substrates simultaneously.

That is, the above-mentioned steps is to separately thin the second substrate, i.e. an asymmetric thinning. In order to make the finished product to be ultrathin, the first and second substrates may be chemically thinned simultaneously to achieve the target thickness (the simultaneous thinning process may be performed before or after the above-mentioned asymmetric thinning process).

Optionally, after the second substrate is chemically thinned at a side thereof away from the first substrate and the first and second substrates are chemically thinned simultaneously, the thickness of the second substrate is in the range from 0.1 mm to 0.35 mm.

According to the method of thinning the display panel in some embodiments of the present disclosure, the intermediate layer 3 is coated onto the surface of the first substrate away from the second substrate, the protection adhesive 4 is attached on the intermediate layer 3, and the second substrate is thinned chemically at one side thereof, thereby protecting the first substrate from being chemically thinned during the chemical thinning and achieving an asymmetric thinning. By such method, the first substrate of the display panel is thicker than the second substrate thereof, so that the display panel has a high strength and a good supporting capacity. The display panel formed by the method in the present disclosure is applicable to a variety of display devices, in particular to the ultrathin liquid crystal display device.

Apparently, various modifications may be made to the above embodiments. For example, the particular thinned thickness may be adjusted based on different product requirements by such ways as adjusting the acidity of the etching liquid for the chemical thinning, or adjusting the immersing time.

Figure 3:
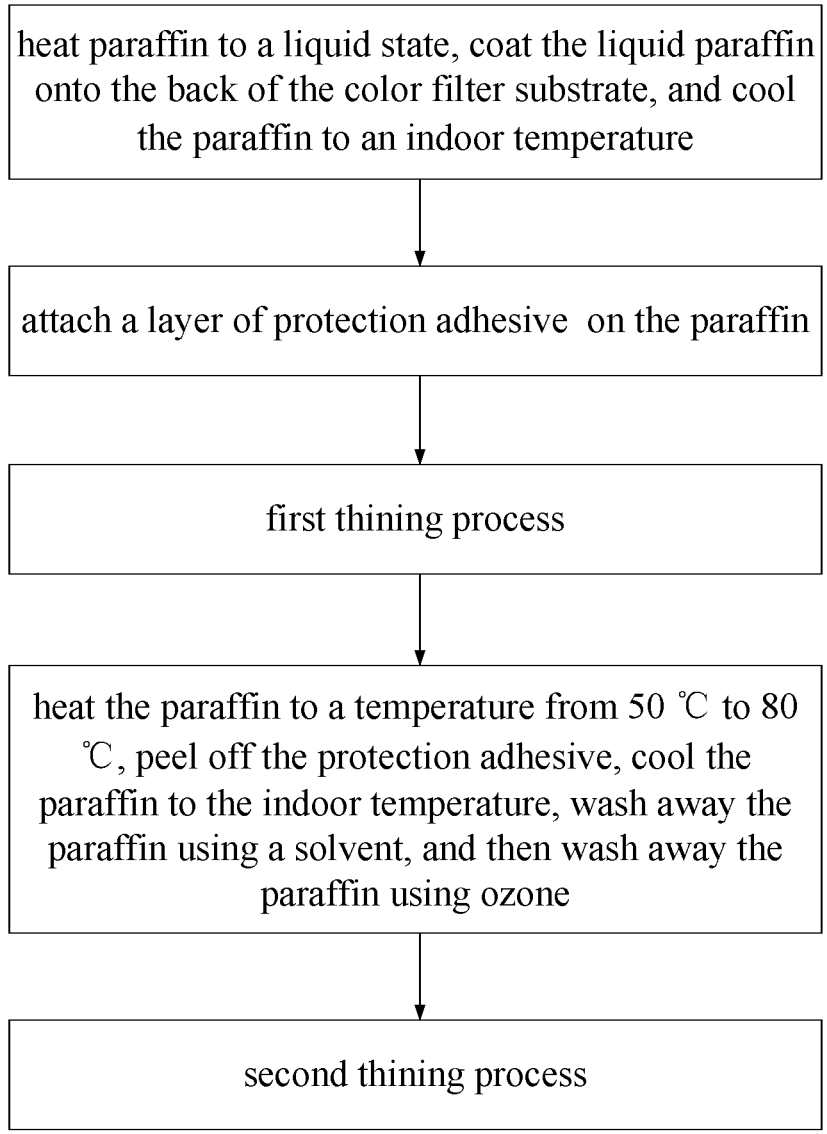
FIG. 3 is a flow chart of a method of thinning a display panel in some embodiments of the present disclosure.

A method of thinning a display panel having a thickness of 1.200 mm and a size of 1100×1300 mm is provided in some embodiments of the present disclosure. The display panel includes a color filter substrate and an array substrate oppositely arranged to form a cell. As shown in FIG. 3, the method of thinning the display panel of the present embodiment specifically includes: heating paraffin to a liquid state (50-80° C.), and coating the liquid paraffin on the back of the color filter substrate, and cooling the paraffin to an indoor temperature; attaching a layer of protection adhesive 4 on the paraffin; providing an etching liquid in a container, and immersing the above-mentioned display panel in the etching liquid for 15 to 40 minutes; heating the paraffin to a temperature from 50° C. to 80° C., peeling off the protection adhesive 4, cooling the paraffin to the indoor temperature, washing away the paraffin using a solvent, and then washing away the paraffin using ozone; and providing an etching liquid in a container, and immersing the above-mentioned display panel in the etching liquid for 15 to 40 minutes.

Figure 4:
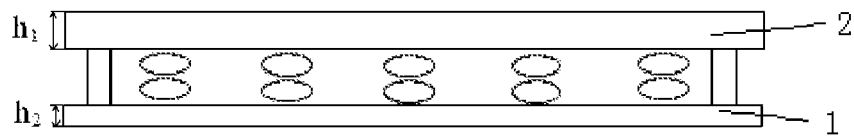
FIG. 4 is a schematic diagram of a display panel manufactured by a method of thinning a display panel in some embodiments of the present disclosure.

FIG. 4 is a schematic diagram of a display panel manufactured by a method of thinning a display panel in some embodiments of the present disclosure, where $h_1-h_2=0.01$ to $0.12$ mm.

A display device is provided in some embodiments of the present disclosure, including a display panel manufactured by the method hereinabove. The display device may be any product or component having a display function such as liquid crystal display panel, electronic paper, mobile phone, tablet computer, television, display, laptop computer, a digital photo frame and a navigator.

It should be understood that, the above are merely the preferred embodiments of the present disclosure for illustration. A person skilled in the art may make further modifications and improvements without departing from the principle of the present disclosure, and these modifications and improvements shall also fall within the scope of the present disclosure.

What is claimed is:

1. A method of thinning a display panel, wherein the display panel comprises a first substrate and a second substrate oppositely arranged to form a cell, and the method comprises:
    coating an intermediate layer onto a surface of the first substrate away from the second substrate;
    attaching a protection adhesive on the intermediate layer;
    thinning chemically the second substrate at a side thereof away from the first substrate;
    removing the protection adhesive;
    washing away the intermediate layer by a solvent; and
        washing away the intermediate layer by ozone.

2. The method according to claim 1, further comprising, subsequent to the washing away the intermediate layer by ozone:
    immersing the display panel in an etching liquid.

3. The method according to claim 1, wherein the thinning chemically the second substrate at a side thereof away from the first substrate comprises:
    immersing the display panel in an etching liquid.

4. The method according to claim 1, wherein
    the intermediate layer is made of paraffin,
    the coating an intermediate layer onto a surface of the first substrate away from the second substrate comprises:
    heating the paraffin;
    coating the paraffin onto the surface of the first substrate away from the second substrate; and
    cooling the paraffin to an indoor temperature.

5. The method according to claim 4, wherein the paraffin is heated to a temperature in a range from 50 degrees centigrade to 80 degrees centigrade.

6. The method according to claim 1, wherein the second substrate has a thickness in a range from 0.1 millimeter to 0.35 millimeter.

7. The method according to claim 1, wherein the first substrate is a color filter substrate, and the second substrate is an array substrate.

8. The method according to claim 1, wherein the intermediate layer coated on the first substrate has a thickness in a range from 0.5 millimeter to 1 millimeter.

9. The method according to claim 1, wherein the thinning chemically the second substrate at a side thereof away from the first substrate comprises:
    thinning the second substrate by 0.01 millimeter to 0.12 millimeter at the side thereof away from the first substrate.

* * * * *